US012654128B2

(12) United States Patent
Leclerc et al.

(10) Patent No.: US 12,654,128 B2
(45) Date of Patent: Jun. 16, 2026

(54) METHOD AND APPARATUS FOR DRYING A FLOW RICH IN CARBON DIOXIDE

(71) Applicant: L'Air Liquide, Société Anonyme pour l'Etude et l'Exploitation des Procédés Georges Claude, Paris (FR)

(72) Inventors: Mathieu Leclerc, Paris (FR); Félix Pere, Paris (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 382 days.

(21) Appl. No.: 18/272,408

(22) PCT Filed: Jan. 7, 2022

(86) PCT No.: PCT/EP2022/050276
§ 371 (c)(1),
(2) Date: Jul. 14, 2023

(87) PCT Pub. No.: WO2022/152629
PCT Pub. Date: Jul. 21, 2022

(65) Prior Publication Data
US 2024/0066462 A1 Feb. 29, 2024

(30) Foreign Application Priority Data
Jan. 14, 2021 (FR) ...................................... 2100351

(51) Int. Cl.
*B01D 53/26* (2006.01)
*B01D 53/04* (2006.01)
(Continued)

(52) U.S. Cl.
CPC ......... *B01D 53/261* (2013.01); *B01D 53/047* (2013.01); *B01D 53/0473* (2013.01);
(Continued)

(58) Field of Classification Search
CPC .... B01D 53/261; B01D 53/265; B01D 53/04; B01D 53/047; B01D 53/0473;
(Continued)

(56) References Cited

U.S. PATENT DOCUMENTS

2007/0232706 A1 10/2007 Shah et al.
2010/0024476 A1 2/2010 Shah
(Continued)

FOREIGN PATENT DOCUMENTS

FR 2 872 890 1/2006
FR 2 954 179 6/2011
(Continued)

OTHER PUBLICATIONS

International Search Report for corresponding PCT/EP2022/050276, Aug. 25, 2022.

*Primary Examiner* — Frank M Lawrence, Jr.
(74) *Attorney, Agent, or Firm* — Elwood L. Haynes

(57) ABSTRACT

In a method for drying a first wet gas stream containing at least 90 mol % $CO_2$, the first $CO_2$ stream is dried in a water adsorption unit, at least a portion of the regeneration gas from the adsorbers being a gas containing at least 90 mol % carbon dioxide produced in a separation apparatus (33) that separates a gas (31) containing carbon dioxide and at least one impurity by partial condensation and/or distillation at a temperature below 0° C.

15 Claims, 1 Drawing Sheet

(51) Int. Cl.
    *B01D 53/047*       (2006.01)
    *C01B 32/50*       (2017.01)

(52) U.S. Cl.
    CPC ........ *B01D 53/265* (2013.01); *B01D 2256/22* (2013.01); *B01D 2257/80* (2013.01); *B01D 2259/40052* (2013.01)

(58) Field of Classification Search
    CPC ............ B01D 2256/22; B01D 2257/80; B01D 2259/40052; B01D 2259/402; B01D 2259/416; C01B 32/50; F25J 2205/66; F25J 2220/80; F25J 2230/04; F25J 2230/32; F25J 2230/80; F25J 2260/80; F25J 3/0266; F25J 3/067; Y02C 20/40
    USPC ..... 95/96, 97, 104, 106, 117, 121–124, 126, 95/139; 96/121, 134, 143, 144
    See application file for complete search history.

(56) References Cited

U.S. PATENT DOCUMENTS

| | | |
|---|---|---|
| 2012/0272680 A1 | 11/2012 | Briglia et al. |
| 2013/0298599 A1 | 11/2013 | Stallmann |
| 2015/0174523 A1 | 6/2015 | Darde et al. |
| 2016/0264418 A1 | 9/2016 | Leclerc et al. |
| 2018/0221815 A1* | 8/2018 | Kikkawa ............... B01D 53/75 |
| 2019/0178574 A1* | 6/2019 | Naito ................. B01D 53/0462 |
| 2021/0172677 A1* | 6/2021 | Terrien .................. F25J 3/0209 |

FOREIGN PATENT DOCUMENTS

| | | | |
|---|---|---|---|
| FR | 3 012 973 | 5/2015 | |
| WO | WO-2007123673 A1 * | 11/2007 | ................ F25J 3/08 |

* cited by examiner

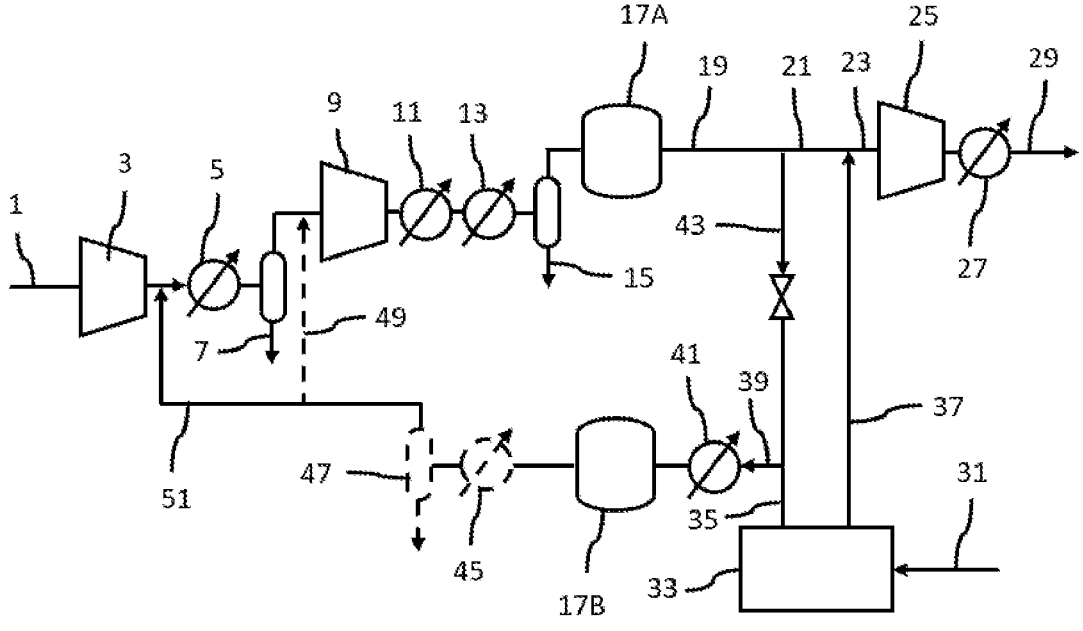

METHOD AND APPARATUS FOR DRYING A FLOW RICH IN CARBON DIOXIDE

CROSS REFERENCE TO RELATED APPLICATIONS

This application is a 371 of International Application No. PCT/EP2022/050276, filed Jan. 7, 2022, which claims priority to French Patent Application No. 2100351, filed Jan. 14, 2021, the entire contents of which are incorporated herein by reference.

BACKGROUND

The present invention relates to a method and to an apparatus for drying a flow rich in carbon dioxide. A flow rich in carbon dioxide contains at least 90 mol %, preferably at least 95 mol %, or even at least 98 mol % $CO_2$ on a dry basis.

$CO_2$ separation units may be disseminated within an industrial basin over a plurality of emitters. Most separation methods, for example those involving physical, chemical or physicochemical absorption, produce $CO_2$ at low pressure and saturated with water, such as for example amine scrubbing methods. It is therefore necessary to compress and dry the $CO_2$ produced before export and/or liquefaction for sequestration or use.

Synergies can be found by sharing the compression and drying units between the various emitters in order to achieve economies of scale and especially of infrastructure. In particular, sharing with $CO_2$ coming from a cryogenic $CO_2$ separation unit may afford additional savings.

It is known from FR2954179 to dry a flow rich in carbon dioxide produced by amine scrubbing using an adsorption step.

$CO_2$ compression and drying thereof may be configured in the following manner:

Compression of the wet $CO_2$ to an intermediate pressure or to the final pressure, Cooling of the compressed gas (with a fluid at ambient temperature, such as air or refrigeration water or even with refrigerated water) making it possible to discharge a part of the water in the form of condensates, Drying by adsorption:
one cylinder is in production,
the other, identical, cylinder is in parallel and in regeneration. Regeneration is performed by the passage of a hot stream, preferably at lower pressure in order to reduce the dimensions of the dryer. The regeneration gas may be a part of the dried gas (5 to 30%). The gas that was used for the regeneration is expanded and recycled in the compressor in a section at lower pressure. The water resulting from the regeneration is thus partially eliminated jointly with the condensates.

Compression of the dry $CO_2$ to the final pressure in the case of drying at an intermediate pressure.

A part of the energy consumed is therefore linked to recompression of the regeneration gas and refrigeration thereof in the case of cooling with refrigerated water.

In the case of integration of $CO_2$ coming from a cryogenic separation unit, $CO_2$ coming from the cryogenic separation is available dry and under pressure, at least at a pressure close to that of the triple point of $CO_2$, the cryogenic separation generally being at least partially carried out at this pressure. In the case of common compression, this $CO_2$ is integrated at an intermediate level of the compressor. If the cryogenic separation unit provides other streams of $CO_2$ at higher pressure, they can also be integrated at a nearby level in the compressor.

The dryer is usually operated at a higher pressure than the injection at the pressure close to the triple point of $CO_2$ for technical and economic reasons (quantity of residual water to be adsorbed, size of the adsorbers and selection of the materials of the compressors needing to be taken into account in particular).

According to one subject of the invention, there is provided a method for drying a first wet gas stream containing at least 90 mol %, preferably at least 95 mol %, or even at least 98 mol % $CO_2$ on a dry basis, comprising the following steps:

i) optionally, compressing the first wet gas stream to a first pressure in order to obtain a first wet gas stream at the first pressure, ii) drying the first $CO_2$ stream in a water adsorption unit of the type implementing n adsorbers with, for each adsorber, a cycle comprising the following operating phases, which are offset from one adsorber to another by an nth of the duration (T) of the cycle:

a) adsorption, this adsorption phase involving the admission of the first wet gas stream into the adsorber via a first end, called inlet end, of the adsorber, with circulation of this stream in the adsorber and simultaneous withdrawal, via the other end of the adsorber, of gas purified of water and b) regeneration of the adsorber during which a regeneration gas regenerates the adsorber, the first stream being purified of water in one of the adsorbers so as to produce a dried gas while the regeneration gas is sent to another of the adsorbers, at least a part of the regeneration gas being a gas containing at least 90 mol % of carbon dioxide produced in a separation apparatus that separates a gas containing carbon dioxide and at least one impurity by partial condensation and/or distillation at a temperature of less than 0° C., characterized in that the gas containing carbon dioxide and at least one impurity is not the dried gas and is not derived from the dried gas.

According to other optional subjects:

the gas purified in the adsorption unit is compressed in a compressor with a gas containing at least 90 mol %, preferably at least 95 mol %, or even at least 98 mol % of carbon dioxide coming from the separation apparatus.

the gas purified in the adsorption unit is compressed in a compressor with a gas coming from the separation apparatus that is richer in carbon dioxide than the gas containing carbon dioxide and at least one impurity.

the first stream is compressed by at least one compression step then cooled in at least one cooler downstream of the compression step, at least a part of the water produced by the compression and the cooling being removed upstream of the adsorption.

the regeneration gas that has regenerated the adsorber is sent to be mixed with the wet stream upstream of at least one of the compression steps and at least one of the coolers.

at least a part of the regeneration gas is constituted by a part of the first stream purified in the adsorption unit.

the first stream originates from a method treating a flow containing carbon dioxide so as to enrich it in carbon dioxide, for example a physical, chemical or physicochemical absorption method or an adsorption method.

the adsorption unit is a temperature swing adsorption unit and the pressure of the adsorption is greater than that of the regeneration.

the pressure of the adsorption and the pressure of the regeneration are greater than 4.5 bar abs, preferably than 5.5 bar abs or even than 6.5 bar abs.

the adsorption pressure is at least equal to 10 bar abs.

the adsorption unit comprises two or three adsorbers.

According to another subject of the invention, there is provided an apparatus for drying a first wet gas stream containing at least 90 mol %, preferably at least 95 mol %, or even at least 98 mol % $CO_2$ on a dry basis, comprising:

i) Optionally, a compressor for compressing the first wet gas stream to a first pressure in order to obtain a first wet gas stream at a first pressure ii) a water adsorption unit, of the type implementing n adsorbers with, for each adsorber, a cycle comprising the following operating phases, which are offset from one adsorber to another by an nth of the duration (T) of the cycle:

a) adsorption, this adsorption phase involving the admission of the first wet gas stream into the adsorber via a first end, called inlet end, of the adsorber, with circulation of this stream in the adsorber and simultaneous withdrawal, via the other end of the adsorber, of gas purified of water and b) regeneration of the adsorber during which a regeneration gas regenerates the adsorber, i) means for sending the first wet gas stream to the water adsorption unit, ii) means for extracting a dried gas rich in $CO_2$ from the adsorption unit, iii) means for sending a regeneration gas to the adsorption unit, the means for sending a regeneration gas to the adsorption unit being connected to a separation apparatus that separates a gas containing carbon dioxide and at least one impurity by partial condensation and/or distillation at a temperature of less than 0° C. so as to use a gas containing at least 90 mol % of carbon dioxide produced by the separation apparatus as regeneration gas, characterized in that the apparatus does not comprise means for sending the dry gas or a gas derived from the dry gas to be separated in the separation apparatus.

According to other optional aspects:

the apparatus comprises means for drying the gas containing carbon dioxide and at least one impurity upstream of the separation apparatus.

the apparatus comprises an apparatus for separation by physical, chemical, or physicochemical absorption that produces the first wet gas stream.

means for sending the dry gas to an element other than the separation apparatus.

The invention makes it possible to reduce the compression and/or refrigeration energy in order to produce dry carbon dioxide from a method producing wet carbon dioxide. The size of the $CO_2$ dryer of the refrigeration unit and of the compression section treating the $CO_2$ may also be reduced. In cases in which the method uses compresses together flows resulting from the absorption and the separation at low temperature, the number of rotating machines may be reduced.

Among the innovative features of variants of the invention, there may be noted:

Operating the dryer at a pressure greater than that of the triple point of $CO_2$, at the outlet of a second section of the compressor.

Using the dry $CO_2$ coming from the cryogenic separation unit at a pressure close to the triple point of $CO_2$ as regeneration gas.

Recycling this regeneration gas at the outlet of a first section of the compressor.

In this way, advantage is taken of the availability of a dry gas at lower pressure than the dryer in order to regenerate it. It is not necessary to expand and recycle a part of the dry $CO_2$ at the outlet of the dryer, thus allowing an energy saving and reduction in the size of the equipment in the regeneration loop.

When the $CO_2$ separation unit is stopped or at low load, the flow of $CO_2$ at the pressure close to the triple point of $CO_2$ may prove insufficient for the regeneration of the dryer. In this case, the remainder may be provided by a part of the dry $CO_2$ leaving the dryer, which has been expanded.

A variant of the method according to the invention may be the common use of the intermediate cooler of the compressor in order to cool the gas resulting from the preceding compressor section and the hot gas resulting from the regeneration of the dryer.

In the case of a condensate separator separate from the intermediate cooler of the compressor, the latter may also be shared in order to separate the condensates from the gaseous $CO_2$ resulting from the preceding compressor section and the hot gas resulting from the regeneration of the dryer.

BRIEF DESCRIPTION OF THE DRAWINGS

For a further understanding of the nature and objects for the present invention, reference should be made to the following detailed description, taken in conjunction with the accompanying drawing, in which like elements are given the same or analogous reference numbers and wherein:

FIG. 1 illustrates a method according to the invention.

DETAILED DESCRIPTION OF PREFERRED EMBODIMENTS

A flow 1 of gas enriched in carbon dioxide originates from a carbon dioxide separation method, such as a physical, chemical or physicochemical absorption or adsorption method treating a flow containing carbon dioxide. A plurality of separation units producing wet carbon dioxide flows can supply a single drying apparatus, according to the invention. The flow 1 contains at least 90% of carbon dioxide on a dry basis, preferably at least 95 mol %, or even at least 98 mol % $CO_2$ on a dry basis, and water. It is typically at a pressure between 1 and 2 bar absolute and may also contain impurities such as nitrogen, hydrogen, methane, oxygen and methanol. The flow 1 is compressed in a compression stage 3 and then cooled in a cooler 5, and this has the effect of condensing a part 7 of the water that it contains. The remaining gas is compressed in a compression stage 9 and then cooled in one or even two coolers 11, 13, and this has the effect of condensing a part 15 of the water that it contains. The dried gas is sent to one of the at least two adsorbers of an adsorption unit of PTSA (pressure and temperature swing adsorption) type comprising at least two adsorbers containing alumina. Three adsorbers may prove necessary for larger installations. While one of the adsorbers adsorbs the water in the dried gas, the other adsorber (or one of the other adsorbers) is regenerated by a regeneration gas. A dry flow 19 rich in $CO_2$ leaves the adsorber 17A and is compressed in a compressor 25 before being cooled in a cooler 27 so as to produce a flow of dry gas 29. If the dry flow 19 leaves the adsorber 17A at the required pressure, no compression will be necessary. Likewise, if the gas 1 is available at the pressure required for the adsorption, no compression is necessary upstream of the adsorbers 17A, 17B.

The adsorption is effected at a pressure greater than that of the triple point of $CO_2$, in this case at the outlet of a second section of the compressor 9. This minimum pressure may for example be between 5 and 6.5 bar abs so as to take account of the pressure drops, or even between 5 and 6 bar abs. The adsorption preferably takes place at at least 10 bar abs, for example between 18 and 20 bar abs.

A flow 31 of gas containing carbon dioxide and at least one impurity (such as oxygen, nitrogen, argon, hydrogen, carbon monoxide) is sent to a separation apparatus 33 where the gas is cooled and separated by partial condensation and/or distillation so as to produce at least one gas enriched in carbon dioxide 35 relative to the flow 31 and not containing water. If the flow 31 contains water, this has to be removed upstream of the cooling down to a temperature below 0° C. that necessarily precedes the partial condensation and/or distillation. The gas enriched in carbon dioxide 35 is therefore necessarily dry and perfectly suitable for regeneration of the adsorber 17B saturated with water, which was used previously to purify the gas 1.

This flow 31 is not the dry gas 29 and has not been derived from the dry gas 29. Preferably, it contains less than at least 90 mol %, preferably at least 95 mol %, or even at least 98 mol % $CO_2$ on a dry basis.

The dry gas 29 is sent to an element other than the separation apparatus 33.

The gas 35 is heated by heat exchange against the flow 31 in a heat exchanger (not shown) forming part of the separation apparatus so as to bring it to a temperature between 0 and 20° C. It is at a pressure of at least 5 bar abs, preferably at least 6 bar abs, or even at least 6.5 bar abs. This dry gas 35 coming from the separation apparatus is at a pressure close to the triple point of $CO_2$, for example between 5 and 6.5 bar abs, or even between 5 and 6 bar abs.

The gas 35 is heated by a heater 41 and then regenerates the adsorber 17B. The flow of regeneration gas 51 containing water is cooled in the cooler 45 so as to condense at least a part of the water that is then separated in the separator 47. The formed gas 49 may be recycled just upstream of the compression stage 9 and/or as flow 51 downstream of the compression stage 3 and upstream of the cooler 5.

This recycling makes it possible to reduce the losses of carbon dioxide.

If the separation apparatus 33 produces less gas 35 or no gas 35, the gas 43 may be used to regenerate the adsorber 17B, therefore by taking a part of the gas 19.

A gas 37 rich in carbon dioxide coming from the separation apparatus 33 may be compressed in the compressor 25 so as to form part of the product 29. It may be mixed with the gas 19 upstream of the compressor 25 or otherwise introduced at an intermediate level of the compressor according to its pressure. It preferably contains at least 90 mol %, preferably at least 95 mol %, or even at least 98 mol % of carbon dioxide.

A part of the gas 37 can also be used to regenerate the adsorber 17B. This is particularly advantageous if the gas to be dried is at a higher pressure. In this case, the adsorber 17A is operated at a pressure greater than that of the fluid 37 that has to be integrated in another stage lower than the dryer.

In this FIGURE, the gas 35 and the gas 37 may be produced at different pressures, one corresponding to the regeneration pressure and the other to an inlet or interstage pressure of the compressor 25. They may also have different compositions.

The gas 35 and/or the gas 37 preferably contains (or contain) at least 90 mol %, preferably at least 95 mol %, or even at least 98 mol % $CO_2$. They are enriched in carbon dioxide relative to the flow 31.

It is also possible to use a single gas produced by the apparatus 33 to serve partly as regeneration gas and partly as product, optionally to be compressed in the compressor 25.

The use of a common compressor 25 to compress the gas rich in carbon dioxide coming from both a low-temperature separation apparatus and at least one apparatus producing wet carbon dioxide makes it possible to reduce the total number of rotating machines on the site.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for drying a first wet gas stream containing at least 90 mol % $CO_2$ on a dry basis, comprising:
   i) compressing the first wet gas stream to a first pressure in order to obtain a first wet gas stream at the first pressure,
   ii) drying the first wet gas stream in a water adsorption unit of the type implementing n adsorbers with, for each adsorber, a cycle comprising the following operating phases, which are offset from one adsorber to another by an nth of the duration (T) of the cycle:
      a. an adsorption phase comprising admission of the first wet gas stream into the adsorber via a first end of the adsorber, with circulation of the stream in the adsorber and simultaneous withdrawal, via a second end of the adsorber, of gas purified of water, and
      b. regeneration of the adsorber during which a regeneration gas regenerates the adsorber,
   removing water from the first wet gas stream in one of the adsorbers thereby producing a dried gas
   sending the regeneration gas to another of the adsorbers, the regeneration gas formed by adding a gas containing at least 90 mol % of carbon dioxide produced in a separation apparatus that separates a gas containing carbon dioxide and at least one impurity by partial condensation and/or distillation at a temperature of less than 0° C.,
   wherein the gas containing carbon dioxide and at least one impurity is not the dried gas and is not derived from the dried gas.

2. The method as claimed in claim 1, wherein the gas purified in the adsorption unit is compressed in a compressor with a gas containing at least 90 mol % % of carbon dioxide coming from the separation apparatus.

3. The method as claimed in claim 1, wherein the gas purified in the adsorption unit is compressed in a compressor with a gas coming from the separation apparatus that is richer in carbon dioxide than the gas containing carbon dioxide and at least one impurity.

4. The method as claimed in claim 1, wherein the first wet gas stream is compressed by at least one compression step then cooled in at least one cooler downstream of the compression step, at least a part of the water produced by the compression and the cooling being removed upstream of the adsorption.

5. The method as claimed in claim 4, wherein the regeneration gas that has regenerated the adsorber is sent to be mixed with the first wet gas stream upstream of at least one of the compression steps and at least one of the coolers.

6. The method as claimed in claim 4, wherein at least a part of the regeneration gas is constituted by a part of the first wet gas stream purified in the adsorption unit.

7. The method as claimed in claim 4, wherein the first wet gas stream originates from a method treating a flow containing carbon dioxide so as to enrich it in carbon dioxide.

8. The method as claimed in claim 1, wherein the adsorption unit is a temperature swing adsorption unit and the pressure of the adsorption is greater than that of the regeneration.

9. The method as claimed in claim 1, wherein the pressure of the adsorption and the pressure of the regeneration are greater than 4.5 bar abs.

10. The method as claimed in claim 9, wherein the adsorption pressure is at least equal to 10 bar abs.

11. The method as claimed in claim 1, wherein the gas containing carbon dioxide and at least one impurity contains less than 90 mol % $CO_2$ on a dry basis.

12. The method as claimed in claim 1, wherein the gas) gas containing carbon dioxide and at least one impurity contains less carbon dioxide on a dry basis than the dried gas.

13. An apparatus for drying a first wet gas stream containing at least 90 mol % $CO_2$ on a dry basis, comprising:
- i) a compressor for compressing a first wet gas stream to a first pressure in order to obtain a first wet gas stream at a first pressure,
- ii) a water adsorption unit of the type implementing n adsorbers with, for each adsorber, a cycle comprising the following operating phases, which are offset from one adsorber to another by an nth of the duration of the cycle:
  - a. adsorption: this adsorption phase involving the admission of the first wet gas stream into the adsorber via a first end, called inlet end, of the adsorber, with circulation of this stream in the adsorber and simultaneous withdrawal, via the other end of the adsorber, of gas purified of water and
  - b. regeneration of the adsorber during which a regeneration gas regenerates the adsorber,
- iii) a means for sending the first wet gas stream to the water adsorption unit,
- iv) a means for extracting a dried gas rich in $CO_2$ from the adsorption unit,
- v) a means for sending a regeneration gas to the adsorption unit,
- the means for sending a regeneration gas to the adsorption unit being connected to a separation apparatus that separates a gas containing carbon dioxide and at least one impurity by partial condensation and/or distillation at a temperature of less than 0° C. so as to use a gas containing at least 90 mol % of carbon dioxide produced by the separation apparatus as regeneration gas,
- wherein the apparatus does not comprise means for sending the dried gas or a gas derived from the dried gas to be separated in the separation apparatus.

14. The apparatus as claimed in claim 13, comprising a means for drying the gas containing carbon dioxide and at least one impurity upstream of the separation apparatus.

15. The apparatus as claimed in claim 13, comprising an apparatus for separation by physical, chemical, or physico-chemical absorption that produces the first wet gas stream.

\* \* \* \* \*